US006246888B1

(12) United States Patent
Tsuchiyama

(10) Patent No.: US 6,246,888 B1
(45) Date of Patent: *Jun. 12, 2001

(54) RADIO PAGING RECEIVER AND METHOD FOR CONTROLLING DISPLAY AUTO-RESET FUNCTION

(75) Inventor: Kinya Tsuchiyama, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,169

(22) Filed: Mar. 26, 1999

(30) Foreign Application Priority Data

Mar. 27, 1998 (JP) ................................. 10-080912

(51) Int. Cl.[7] ................ H04Q 7/18; H04B 1/38
(52) U.S. Cl. .............. 455/566; 455/38.3; 455/343; 455/38.2; 455/38.4; 340/825.44
(58) Field of Search ................. 455/31.1, 566, 455/38.3, 343, 31.2–31.3, 574, 38.2, 38.4; 340/825.44

(56) References Cited

U.S. PATENT DOCUMENTS 4,536,761 * 8/1985 Tsunoda et al. ............. 340/825.44
5,627,882 * 5/1997 Chien et al. ..................... 455/38.3
5,774,061 * 6/1998 Kudoh et al. .................... 455/38.4
5,831,544 * 11/1998 Park .................................. 455/38.3
5,890,053 * 3/1999 Hino .................................. 455/566
5,923,265 * 7/1999 Noirjean et al. ............. 340/825.44
5,960,326 * 9/1999 Kido ............................... 455/31.2
6,002,918 * 12/1999 Heiman et al. .................. 455/566
6,141,568 * 10/2000 Sakaguchi ........................ 455/566

FOREIGN PATENT DOCUMENTS

| 2-190037 | 7/1990 | (JP) . |
| 3-46833 | 2/1991 | (JP) . |
| 3-127523 | 5/1991 | (JP) . |
| 6-140981 | 5/1994 | (JP) . |
| 9-149444 | 6/1997 | (JP) . |
| 9-261750 | 10/1997 | (JP) . |

* cited by examiner

Primary Examiner—Lee Nguyen
Assistant Examiner—Simon Nguyen
(74) Attorney, Agent, or Firm—McGinn & Gibb, PLLC

(57) ABSTRACT

A radio paging receiver having a display and a controller for controlling the display to be turned off automatically when no switch operation nor reception message is detected during a predetermined time period within a predetermined time zone.

15 Claims, 7 Drawing Sheets

FIG.5A

DISPLAY AUTO-RESET FUNCTION
MODE SETUP IMAGE

ON          OFF

FIG.5B

"ON" TIME ZONE SETUP IMAGE FOR
DISPLAY AUTO-RESET FUNCTION MODE

1) FULL-TIME "ON"

2) "ON" TIME ZONE SETUP

FIG.5C

DISPLAY AUTO-RESET FUNCTION MODE

"ON" TIME ZONE'S START TIME & END
TIME SETUP IMAGE

PM10:00 ～ AM07:00

RADIO PAGING RECEIVER AND METHOD FOR CONTROLLING DISPLAY AUTO-RESET FUNCTION

FIELD OF THE INVENTION

This invention relates to a radio paging receiver with a display auto-reset function, and relates to a method for controlling a display auto-reset function of radio paging receiver.

BACKGROUND OF THE INVENTION

Some conventional radio paging receivers have a function that when no reception of new message nor switching at operation part occurs during a given time period, the display image of liquid-crystal display can be turned off automatically to avoid consuming its battery by such a useless display image that its user does not need to look. This function is called "display auto-reset function". In a radio paging receiver with such a display auto-reset function, when there is no reception of a new message or a switching of an operation part occurs during a given time period after the radio paging receiver enters a waiting state, the display image of liquid-crystal display can be turned off automatically by the operation of the display auto-reset function.

However, for the conventional radio paging receivers with such a display auto-reset function, since even a display image that is needed can be turned off automatically by the operation of display auto-reset function, the user may be inconvenienced. Therefore, a radio paging receiver having a function that re-displays a display image automatically turned off by the operation of display auto-reset function has been also developed. For example, prior arts about such a function of radio paging receiver are described in Japanese patent application laid-open Nos. 02-190037 (1990) and 03-046833 (1991). In the former application prior art, the content of a message displayed just before the display image is turned off by the operation of display auto-reset function can be re-displayed by the key operation for re-displaying. In the latter application prior art, the content of a message displayed just before the display image is turned off by the operation of display auto-reset function can be re-displayed by the key operation for re-displaying to be conducted within a certain time period after the turn-off of the display image.

Also, though a user who uses less frequently such a radio paging receiver may feel convenient since a useless battery consumption can be cut down to save the life of battery when the display image is turned off automatically after a certain time period after displaying a message, a heavy user who has to operate frequently the switch to re-display a turned-off image to confirm a reception message not noticed and to confirm the reception time will feel inconvenient for the display auto-reset function that automatically turns off the display image after a certain time period after displaying a message. Therefore, many of conventional radio paging receivers with the display auto-reset function are designed such that the user can set selecting the turn-on or turn-off of the display auto-reset function mode where the display auto-reset function operates.

However, such a radio paging receiver capable of selecting the turn-on or turn-off of display auto-reset function mode cannot be always convenient to its user. For example, to a user who uses it frequently during the day but does not frequently use it at night, when selecting the turn-off of display auto-reset function mode in the morning, it can be convenient during the day since the display auto-reset function more is turned off, but it must be set again to select the turn-on of display auto-reset function mode at night when the frequency of use decreases. Thus, the user needs to set selecting the turn-on or turn-off of display auto-reset function mode in the morning and evening, every day.

Accordingly, the conventional radio paging receivers with the display auto-reset function fail to satisfy the requirements of all users.

SUMMARY OF THE INVENTION

Accordingly, it is an object of the invention to provide a radio paging receiver with a display auto-reset function that can be used conveniently by users while saving the battery consumption.

Also, it is an object of the invention to provide a method for controlling a display auto-reset function of radio paging receiver so that it can be used conveniently by users while saving the battery consumption.

According to the invention, a radio paging receiver, comprises:

a display; and means for controlling the display to be turned off automatically when no switch operation nor reception message is detected during a predetermined time period within a predetermined time zone.

According to another aspect of the invention, a radio paging-receiver with a display auto-reset function that means for displaying information including a reception message is turned off automatically when no switch operation nor reception message is detected during a predetermined time period, comprises:

a first setting means for setting a display auto-reset function mode to enable the display auto-reset function;

a second setting means for setting a time zone to enable the display auto-reset function to operate when a setting to turn on the display auto-reset function mode is selected by the first setting means; and a control means for checking whether the detection for switch operation and reception message is conducted within the time zone or not, based on the setting information of the first and second setting means, when no switch operation nor reception message is detected during the predetermined time period, and outputting a control signal to control the power supply for the displaying means to be turned off automatically when the detection is conducted within the time zone.

According to another aspect of the invention, a radio paging receiver with a display auto-reset function that means for displaying information including a reception message is turned off automatically when no switch operation nor reception message is detected during a first predetermined time period, comprises:

a display auto-reset function mode setting means for setting the turn-on or turn-off of a display auto-reset function mode to enable the display auto-reset function;

a time zone setting means for setting a time zone to enable the display auto-reset function to operate when the display auto-reset function mode is set to turn on by the display auto-reset function mode setting means; and a display auto-reset function mode setup and operation controlling means for controlling the display auto-reset function mode setting means and the time zone setting means to start up when setting the turn-on or turn-off of the display auto-reset function mode, determining whether the current time falls within the time zone to enable the display auto-reset function to operate while the display auto-reset function mode is set to turn on, when no switch operation nor reception message is detected during the first predetermined time period after coming to the waiting time after completing the setting by the display auto-reset function mode setting means and the time zone setting means, and outputting a control signal to control the power supply for the displaying means to be turned off automatically when the detection is conducted within the time zone.

According to another aspect of the invention, a method for controlling the display auto-reset function of a radio paging receiver with a display auto-reset function that means for displaying information including a reception message is turned off automatically when no switch operation nor reception message is detected during a first predetermined time period, the radio paging receiver comprising: a display auto-reset function mode setting means for setting the turn-on or turn-off of a display auto-reset function mode to enable the display auto-reset function; a time zone setting means for setting a time zone to enable the display auto-reset function to operate when the display auto-reset function mode is set to turn on by the display auto-reset function mode setting means; and a display auto-reset function mode setup and operation controlling means for controlling the display auto-reset function mode setting means and the time zone setting means to start up when setting the turn-on or turn-off of the display auto-reset function mode, determining whether the current time falls within the time zone to enable the display auto-reset function to operate while the display auto-reset function mode is set to turn on, when no switch operation nor reception message is detected during the first predetermined time period after coming to the waiting time after completing the setting by the display auto-reset function mode setting means and the time zone setting means, and outputting a control signal to control the power supply for the displaying means to be turned off automatically when the detection is conducted within the time zone; comprises the steps of:

displaying a first setup display image for setting the turn-on or turn-off of the display auto-reset function mode to be selected from a function menu list;

returning the radio paging receiver to the waiting state when the display auto-reset function mode is set to turn off in a first selection that selects either the turn-on or turn-off of the display auto-reset function mode on the first setup display image;

displaying a second setup display image for selecting the full-time turn-on of the display auto-reset function mode or the setting of the time zone to turn on the display auto-reset function mode, when the display auto-reset function mode is set to turn on in the first selection;

returning the radio paging receiver to the waiting state when the full-time turn-on of the display auto-reset function mode is selected in a second selection that selects either the full-time turn-on of the display auto-reset function mode or the setting of the time zone to turn on the display auto-reset function mode on the first setup display image;

displaying a third setup display image for setting the time zone to enable the display auto-reset function mode when the setting of the time zone to turn on the display auto-reset function mode is selected in the second selection; and storing start time and end time defining the time zone to enable the display auto-reset function to be set on the third setup display image into the time zone setting means, so that the start time and end time is used as information from the time zone setting means for detecting whether the current time falls within the time zone to enable the display auto-reset function;

wherein the steps are controlled by the display auto-reset function mode setup and operation controlling means.

BRIEF DESCRIPTION OF THE DRAWINGS

The invention will be explained in more detail in conjunction with the appended drawings, wherein:

FIGS. 5A to 5C are illustrations showing setup display images for the setup procedure of display auto-reset function mode.

DESCRIPTION OF THE PREFERRED EMBODIMENTS

Figure 1:
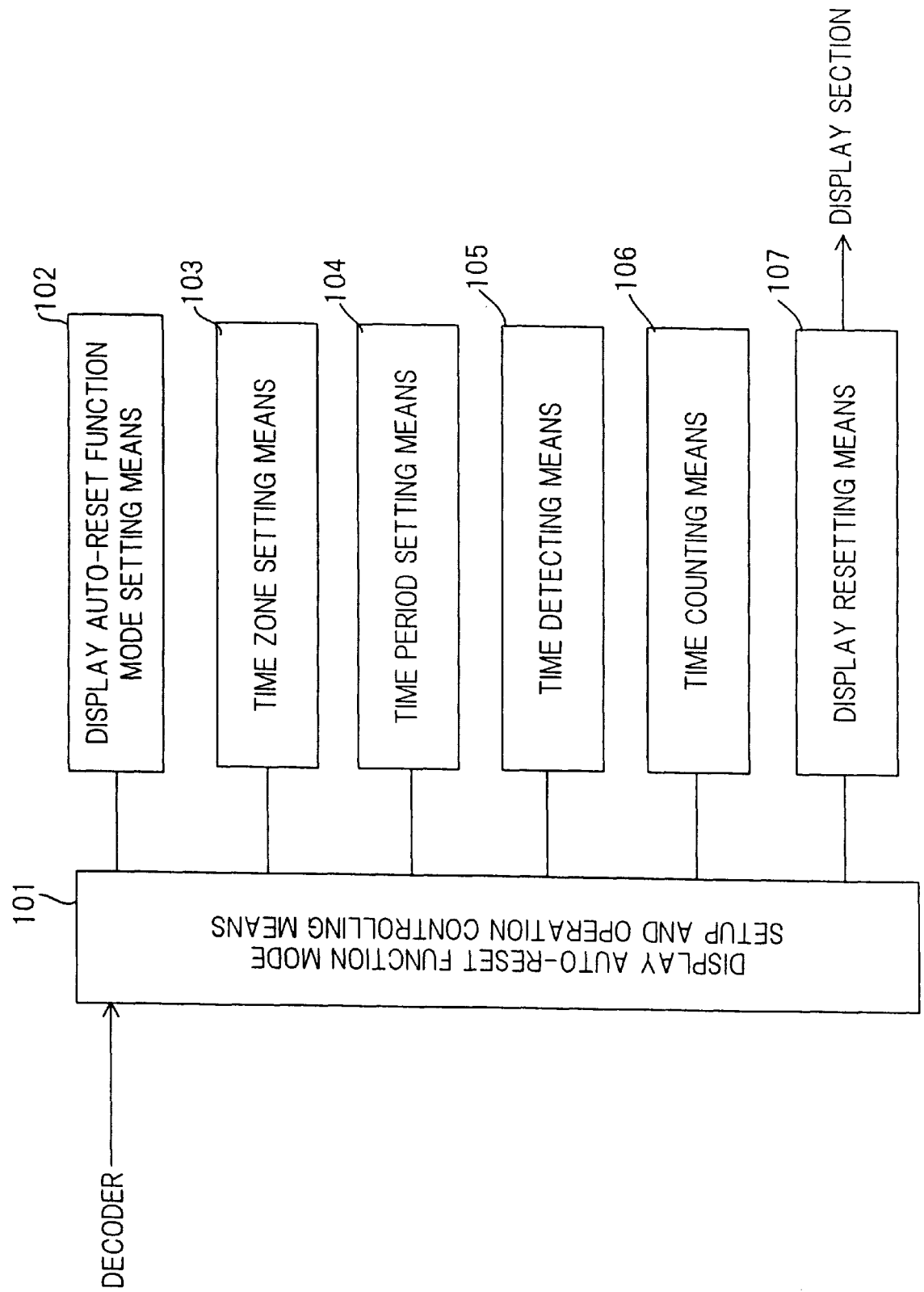
FIG. 1 is a block diagram showing a display auto-reset function control section composing a radio paging receiver in a preferred embodiment according to the invention.

The preferred embodiments according to the invention will be explained below, referring to the drawings.

Figure 2:
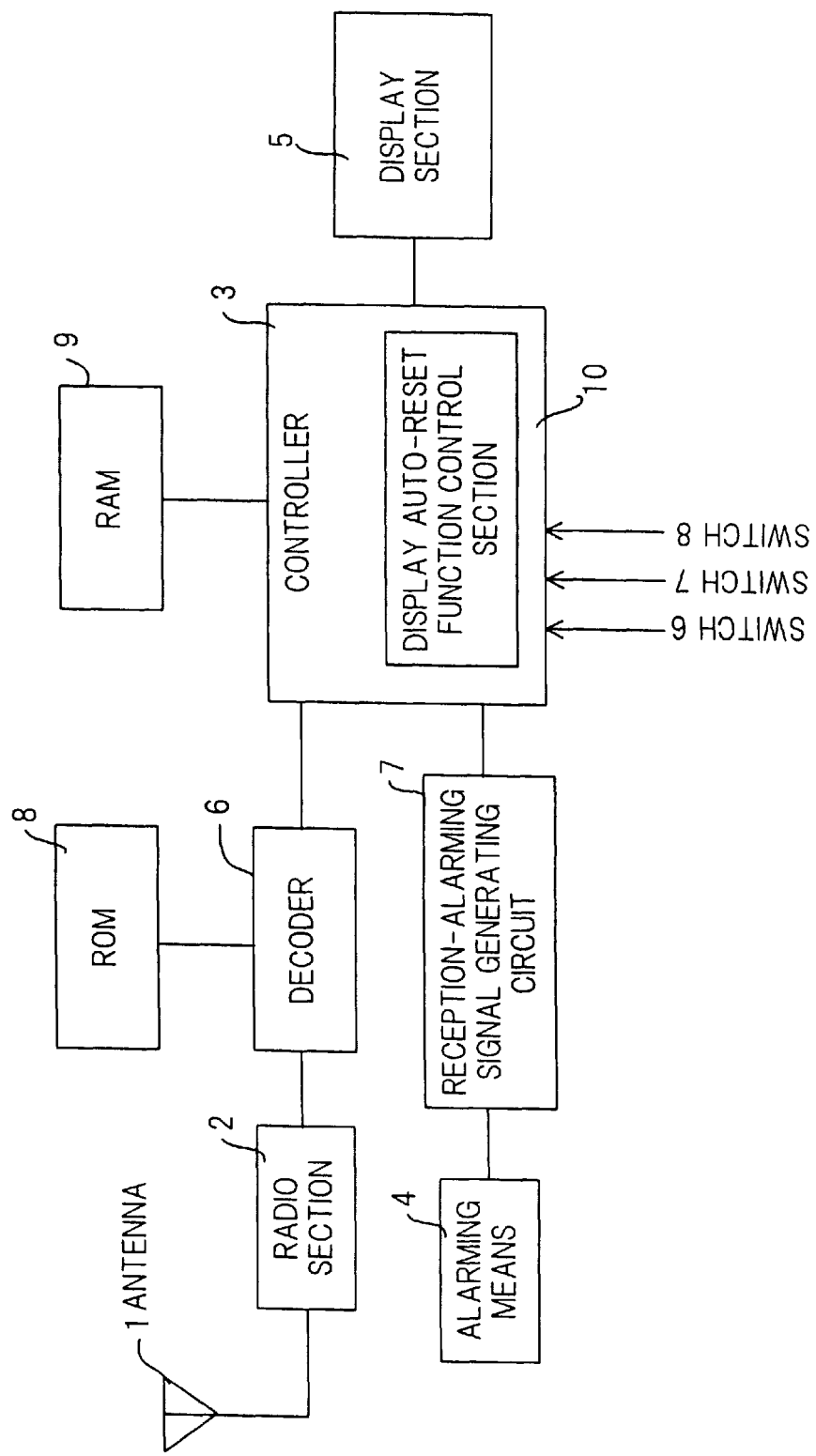
FIG. 2 is a block diagram showing the radio paging receiver in the preferred embodiment according to the invention.

FIG. 2 is a block diagram showing a radio paging receiver in a preferred embodiment according to the invention. Also, FIG. 1 is a block diagram showing a display auto-reset function control section included in the radio paging receiver in FIG. 2.

As shown in FIG. 2, the radio paging receiver in the embodiment comprises a radio section 2 to receive a transmit signal transmitted from a transmitter of base station though an antenna 1 and demodulates it, ROM 8 that stores a specific identification signal assigned to the radio paging receiver, a decoder 6 to compare a received specific identification signal and the specific identification signal stored in ROM 8, outputting a call-reception signal when both coincide each other, also outputting a message signal when the specific identification signal input from the radio section 2 is followed by the message signal, an alarming means 4 that when being paged, notifies the user of the calling by using an LED display, an alarm, a vibration or the like, a call-reception-alarming signal generating circuit 7 to output a call-reception-alarming signal for alarming the paging to the alarming means 4, a display section 5 to display a message when the message is received with the paging, RAM 9 to store a message signal received, switches 6, 7 and 8 to control the various functions of the radio paging receiver including the control of various setup operations for a display auto-reset function mode displayed in the display section 5, and a controller 3 to control the operation of various functions in the radio paging receiver, which includes receiving a call-reception signal output from the decoder 6, instructing the call-reception-alarming signal generating circuit 7 to generate a call-reception-alarming signal and to send it to the alarming means 4, converting a message signal output from the decoder 6 into a character/letter-font signal to display outputting it to the display section 5 and simultaneously storing the message signal into RAM 9, and detecting the switching of the switch 6, 7 or 8 then controlling the displaying of a menu mode image for the setup of various functions displayed in the display section 5 and the various setup operations for a display auto-reset function mode.

Also, the controller 3 comprises a display auto-reset function control section 10. As shown in FIG. 1, the display auto-reset function control section 10 comprises a display auto-reset function mode setting means 102 for setting the turn-on/turn-off of a display auto-reset function mode where the display auto-reset function operates, a time zone setting means 103 for setting a time zone to operate the display auto-reset function when the display auto-reset function is set to turn on by the display auto-reset function mode setting means 102, a time counting means 106 that when the display auto-reset function mode is turned on and then no switch operation nor call-reception message is detected during a given time period (first given time period) within a time zone where the display auto-reset function operates, counts time during a given time period (second given time period other then the former given time period) and then detects this given time period passed away, a time period setting means 104 for setting the second given time period, a time detecting means 105 to be notified of the start time to end time of a time zone set up by the time zone setting means 103 and to output a display auto-reset function mode set time zone notifying signal during the turn-on time period of the display auto-reset function mode, from the start time to end time, to be timed by a built-in timer, a display auto-reset function mode setup and operation controlling means 101 for controlling the display auto-reset function mode setting means 102 and time zone setting means 103 to start up when setting the turn-on/turn-off the display auto-reset function mode, detecting whether the display auto-reset function is set to be full-time turned on or turned on within the time zone enabling the display auto-reset function to operate, based on the information from the display auto-reset function mode setting means 102 and time zone setting means 103, when no switch operation nor call-reception message is detected during the first given time period after coming to the waiting time after completing the setup by the display auto-reset function mode setting means 102 and time zone setting means 103, controlling the time counting means 106 to start counting when determining that the current time falls within the time zone enabling the display auto-reset function to operate by receiving the display auto-reset function mode set time zone notifying signal from the time detecting means 105, turning off automatically the power supply for the display section 5 by outputting a control signal to turn off automatically the power supply for the display section 5 when detecting that the second given time period passed away, stopping the counting of the time counting means 106 to end the display auto-reset operation when a switch operation or call-reception message is detected before the second given time period passes away, then putting the radio paging receiver into the waiting state.

Next, the normal operation of the radio paging receiver to receive a call signal in the waiting state after the power supply is switched on will be explained in brief.

The radio section 2 receives a transmit signal transmitted from a transmitter of a base station though the antenna 1 and demodulates it. The decoder 6 decodes the signal demodulated by the radio section 2, comparing a received specific identification signal and the specific identification signal stored in ROM 8, outputting a call-reception signal to the controller 3 when both coincide with each other, outputting a message signal to the controller 3 when the specific identification signal input from the radio section 2 is followed by the message signal. The controller 3 receives the call-reception signal output from the decoder 6, instructing the call-reception-alarming signal generating circuit 7 to generate a call-reception-alarming signal and to send it to the alarming means 4, converting a message signal output from the decoder 6 into a character/letter-font signal to display outputting it to the display section 5 and simultaneously storing the message signal into RAM 9. The alarming means 4, when being paged, notifies the user of the calling, by using an LED display, an alarm, a vibration or the like.

The methods of using the switches 6, 7 and 8 are explained below.

The user can always read out the content of message by pressing the switches 7 and 8. Namely, in the waiting state of reception, by pressing the switch 7, the message can be read out in the order of old one to new one. With the switch 8, the message can be read out in the order of new one to old one. Also, the switch 6 is a menu switch for entering the menu mode that various functions can be set up, and by pressing the switch 6, the function menu list image can be displayed. Also, when desired to return to a previous image in the process of setting, the switch 6 only has to be pressed. The switch 8 functions as a selection switch in selection when getting into the menu mode, and the switch 7 functions as a determination switch in selection when getting into the menu mode. Namely, one selected by pressing the switch 8 is determined by pressing the switch 7. Meanwhile, the controller 3 is always monitoring the states of the switches 6, 7 and 8, and detects the press-down of respective switches when the logic at the respective switch input terminals to the controller 3 changes from "H" into "L".

Figure 3:
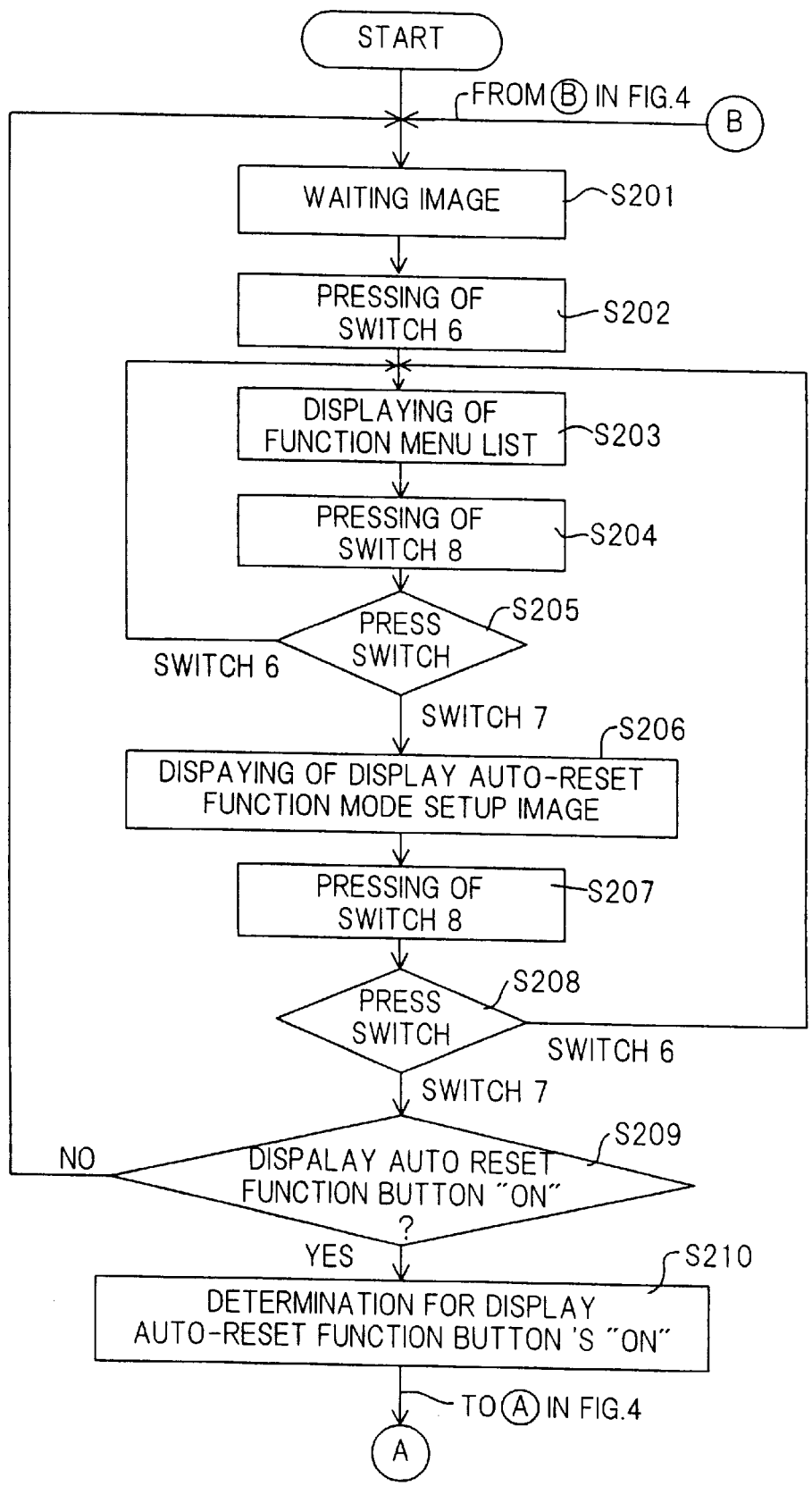
FIGS. 3 and 4 are flow charts showing an example of setup procedure of display auto-reset function mode in the radio paging receiver in the preferred embodiment according to the invention.
Figure 4:
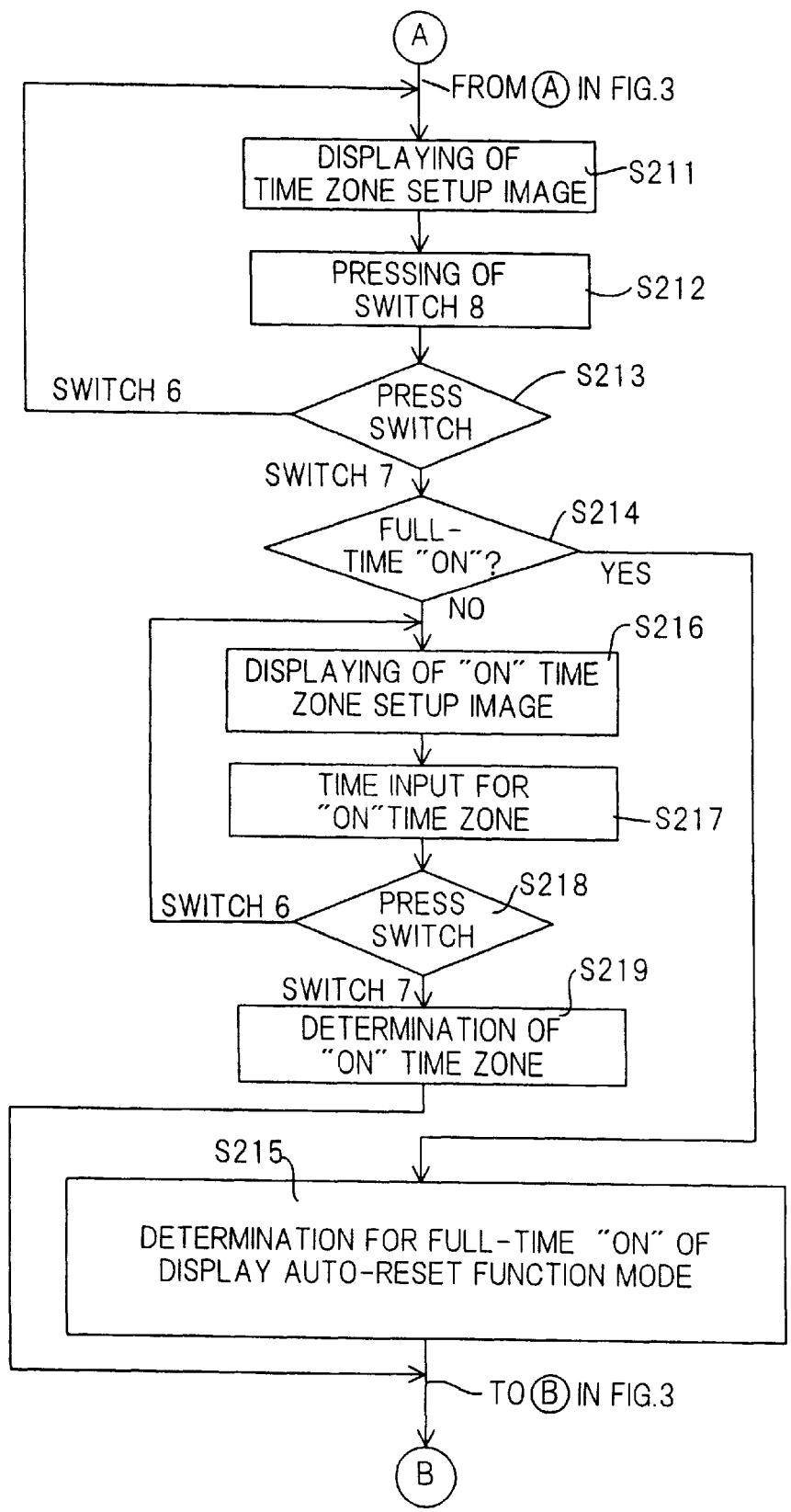

Next, referring to FIGS. 3, 4 and 5, the setup procedure for the turn-on/turn-off of the display auto-reset function mode and the setup procedure for a time zone enabling the display auto-reset function to operate in the waiting state of the radio paging receiver are explained.

As shown in FIG. 3, in a display image (Step201, hereinafter a step is referred to as "S--") for the waiting state of the radio paging receiver, when pressing the switch 6 (S202), the controller 3 controls the display section 5 to display the function menu list image (S203). Pressing the switch 8 for menu selection (S204), the function menu for setting ON/OFF of the display auto-reset function in the function menu list displayed is selected. Further, pressing the switch 7 (S205), the function menu for setting ON/OFF of the display auto-reset function to be selected by pressing the switch 8 is determined, thereby a display auto-reset function mode setup image (see FIG. 5A) is displayed in the display section 5 (S206). Meanwhile, when pressing the switch 6 instead of pressing the switch 7 at S205, the function menu for setting ON/OFF of the display auto-reset function to be selected by pressing the switch 8 is canceled, then returned to S203. Then, when the display auto-reset function mode setup image at S206 is displayed in the display section 5, by pressing the switch 8, either of ON/OFF of the display auto-reset function mode to be displayed on the display auto-reset function mode setup image is selected (S207). Then, when pressing the switch 7 (S208) to determine the selection by the switch 8, it is judged whether the selection by the switch 8 at S207 is ON or OFF (S209) and if the selection by the switch 8 at S207 is ON, then the selection "ON" at S207 is determined (S210). That the display auto-reset function mode is set to be "ON" is stored into a built-in memory (not shown) of the display auto-reset function mode setting means 102 in the display auto-reset function control section 10 of the controller 3. If judged as "OFF" at S209, then returned to S201. Also, when pressing the switch 6 instead of pressing the switch 7 at S208, the function menu for setting ON/OFF of the display auto-reset function to be selected by pressing the switch 8 is canceled, then returned to S203.

When the selection "ON" at S207 is determined, a setup image (see FIG. 5B) for selecting either to set the display auto-reset function mode full-time "ON" or to set a time zone that the display auto-reset function mode is turned "ON" is displayed in the display section 5 (S211 in FIG. 4). In the image shown in FIG. 5B at S211, "FULL-TIME "ON"" for selecting to set the display auto-reset function mode full-time "ON" and ""ON" TIME ZONE SETUP" for selecting to set a time zone that the display auto-reset function mode is turned "ON" are displayed. Pressing the switch 8, either one is selected (S212) Then, when pressing the switch 7 (S213), it is judged whether the selection by the switch 8 at S212 is "FULL-TIME "ON"" or ""ON" TIME ZONE SETUP" (S214). If the selection by the switch 8 at S212 is "FULL-TIME "ON"(YES)", then the selection "FULL-TIME "ON"" is determined and the display auto-reset function is set to be full-time turned on (S215), then returned to S201. The information "FULL-TIME "ON"" set at S215 is stored into a built-in memory (not shown) of the time zone setting means 103. Also, if the selection by the switch 8 at S212 is ""ON" TIME ZONE SETUP" and judged as ""ON" TIME ZONE SETUP(NO)", then the selection ""ON" TIME ZONE SETUP" is determined and a setup image (see FIG. 5C) for setting the start time and end time of the time zone enabling the display auto-reset function to operate is displayed in the display section 5 (S216). Also, when pressing the switch 6 instead of pressing the switch 7 at S213, "FULL-TIME "ON"" or ""ON" TIME ZONE SETUP" selected by pressing the switch 8 is canceled without being determined, then returned to the setup image at S211 for selecting either to set the display auto-reset function mode full-time "ON" or to set a time zone that the display auto-reset function mode is turned "ON".

Then, for the setup image (see FIG. 5C) for setting the time zone enabling the display auto-reset function to operate, by pressing the switch 8, start time and end time that define the time zone enabling the display auto-reset function to operate are selected (S217). For example, in FIG. 5C, the start time and end time are 10 PM and 7 AM, respectively. Then, when pressing the switch 7 (S218), the start time and end time selected in the image for setting the time zone enabling the display auto-reset function to operate are determined and the display auto-reset function mode is set to turn "ON" in the time zone selected at S217, then returned to S201. Also in this case, the information "START TIME and END TIME" of the time zone set at S219 is stored into a built-in memory (not shown) of the time zone setting means 103. Also, when pressing the switch 6 instead of pressing the switch 7 at S218, the start time and end time selected in the image for setting the time zone enabling the display auto-reset function to operate by pressing the switch 8 are canceled without being determined, then returned to the setup image at S216 (see FIG. 5C) for setting the time zone enabling the display auto-reset function to operate.

Meanwhile, when the start time and end time of time zone are set at S219, the display auto-reset function mode setup and operation controlling means 101 of the display auto-reset function control section in the controller 3 is notified of the start time and end time from the time zone setting means 103, then notifying the time detecting means 105 of it. The time detecting means 105 notified sends the display auto-reset function mode set time zone notifying signal to the display auto-reset function mode setup and operation controlling means 101, during the turn-on time period of the display auto-reset function mode, from the start time to end time, to be timed by a built-in timer.

Figure 6:
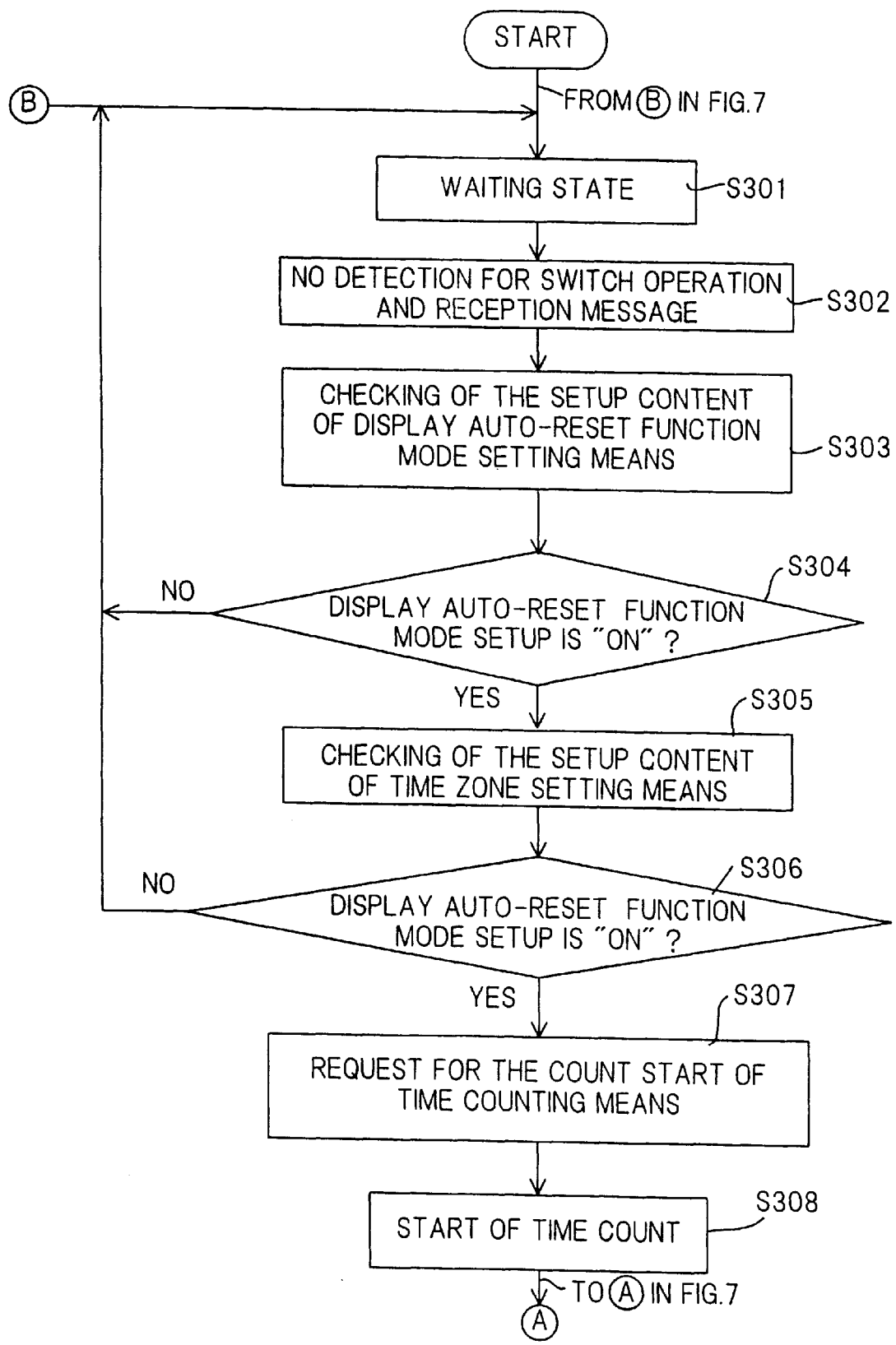
FIGS. 6 and 7 are flow charts showing an example of operation of display auto-reset function in the radio paging receiver in the preferred embodiment according to the invention.
Figure 7:
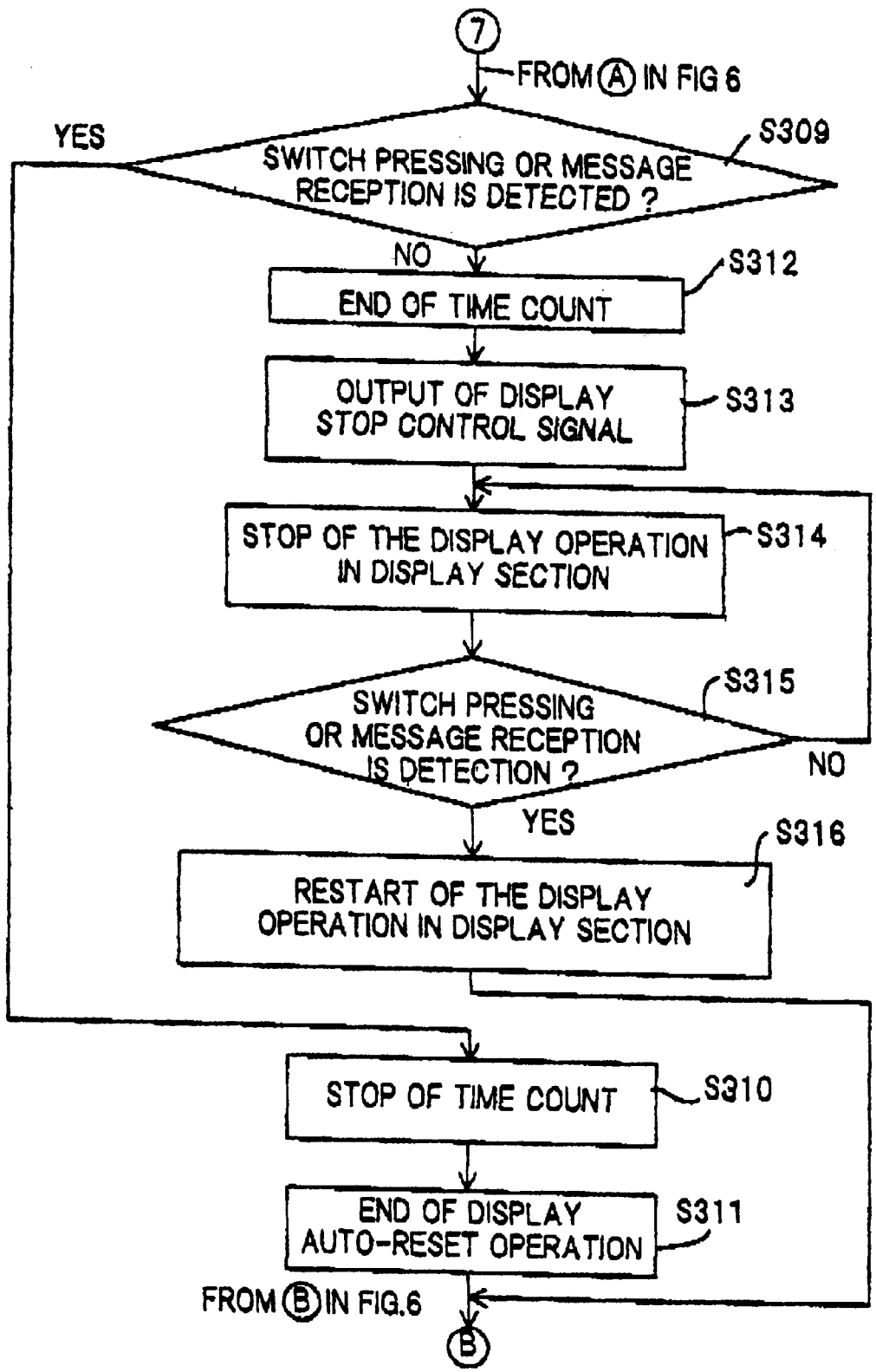

Next, in the waiting state after conducting the setup procedure for the turn-on/turn-off of the display auto-reset function mode and the setup procedure for a time zone enabling the display auto-reset function to operate, the operation of the radio paging receiver when the display auto-reset function operates detecting no switch operation nor call-reception message within a given time period will be explained referring to FIGS. 6 and 7.

In FIG. 2, the radio paging receiver is normally in waiting state, and the controller 3 is monitoring transmit data by a monitor function (not shown) (S301). When the display auto-reset function mode setup and operation controlling means 101 (FIG. 1) of the display auto-reset function control section in the controller 3 detects that there is no switch operation nor call-reception message within a given time period in a given time zone preset (S302), the display auto-reset function mode setup and operation controlling means 101 checks the setting content, i.e., whether the display auto-reset function mode is "ON" or "OFF", of the display auto-reset function stored in the display auto-reset function mode setting means 102 (S303). As the result of checking the setting content of the display auto-reset function, the display auto-reset function mode setup and operation controlling means 101 determines whether the display auto-reset function mode is "ON" or "OFF" (S304), and if it determines that the display auto-reset function mode is "OFF", since "OFF" means the display auto-reset function is not set, ending the operation without starting up the display auto-reset function, then the radio paging receiver is returned to the waiting-operation state.

If the display auto-reset function mode setup and operation controlling means 101 determines that the display auto-reset function mode is "ON", then it checks the setting content of the time zone, where the display auto-reset function is turned on, stored in the time zone setting means 103. Namely, to detect whether the display auto-reset function mode is turned on or not at this time, the display auto-reset function mode setup and operation controlling means 101 checks the time zone setting means 103 as to whether the display auto-reset function mode is set to be full-time turned on or set including a time zone to be turned on and a time zone to be turned off (S305). As the result of checking the setting content as to the turn-on and turn-off of the display auto-reset function, it is judged whether the display auto-reset function mode is set to turn on or turn off (S306). If the setting includes a time zone to be turned on and a time zone to be turned off, the display auto-reset function mode setup and operation controlling means 101 can know whether the display auto-reset function mode is turned on since the time at this time falls within the time zone to be turned on, or turned off since the time at this time falls within the time zone to be turned off, by receiving the display auto-reset function mode set time zone notifying signal being output from the time detecting means 105 during the turn-on time period of the display auto-reset function mode from the start time to end time. If the display auto-reset function mode setup and operation controlling means 101 recognizes that the display auto-reset function mode is set to turn "OFF" at this time, i.e., that the display auto-reset function mode is disenabled to operate, since this "OFF" means the time falls within the time zone disenabling the display auto-reset function to operate, then ending the operation without starting up the display auto-reset function, then the radio paging receiver is returned to the waiting-operation state.

Also, when, in checking the setting content of the time zone setting means 103, the display auto-reset function mode setup and operation controlling means 101 recognizes that the display auto-reset function mode is set to be turn "ON" at that time and the display auto-reset function is allowed to operate, it outputs a time count start request signal to the time counting means 106 (S307). The time counting means 106 receives the time count start request signal, and then starts counting for a given time period set the time period setting means 104 (S308). If a switch operation or message reception is detected (YES) within the given time period set by the time period setting means 104 (S309), then the display auto-reset function mode setup and operation controlling means 101 outputs a time count stop signal to the time counting means 106, controlling the time counting means 106 to stop counting (S310), ending the display auto-reset operation (S311), then returned to the waiting-operation state.

On the other hand, when no switch operation nor message reception is detected (NO) at S309 and the time counting means 106 ends the counting for the given time period (S312), the time counting means 106 outputs a control signal to stop displaying to the display resetting means 107 (S313), and then the display resetting means 107 stops the display operation of the display section 5 (S314). If a switch operation or message reception is detected (YES) (S315) when the display operation of the display section 5 is stopped and the display is turned off, then restarting the display operation of the display section 5 (S316), returned to the waiting-operation state. Also, if no switch operation nor message reception is detected (NO) (S315), then returned to S314 and continuing to stop the display operation of the display section 5.

Meanwhile, in the above embodiment, at S306, in checking whether the display auto-reset function mode is set to turn on or off, when the setting includes a time zone to be turned on and a time zone to be turned off, the display auto-reset function mode setup and operation controlling means 101 can know whether the display auto-reset function mode is turned on since the time at this time falls within the time zone to be turned on, or turned off since the time at this time falls within the time zone to be turned off, by receiving the display auto-reset function mode set time zone notifying signal being output from the time detecting means 105 during the turn-on time period of the display auto-reset function mode from the start time to end time. However, when the display auto-reset function mode setup and operation controlling means 101 has a built-in clock and compares the start time and end time of time zone obtained by checking the time zone setting means 103 with the current time thereby determining whether the display auto-reset function mode is set to turn on or off, it can know whether the display auto-reset function mode is set to turn on or off, without receiving the time zone notifying signal.

Meanwhile, the time zone setting means 103 may be configured such that an already-set time zone enabling the display auto-reset function to operate can be altered, also such that multiple time zones enabling the display auto-reset function to operate can be set.

Also, the time period setting means 104 may be configured such that different second given times can be set to each of multiple time zones enabling the display auto-reset function to operate set by the time zone setting means 103.

Also, in the above embodiment, as shown in the display auto-reset function mode setup image in FIG. 5A, the display auto-reset function mode setting means 102 is operated to select either of the setting or canceling of the display auto-reset function mode. Alternately, adding a further function, it may display the list of already-set time zones enabling the display auto-reset function to operate set by the time zone setting means 103. Namely, instead of the selection image in FIG. 5A, a display image allowing the selection of either of the setting/canceling of the display auto-reset function and the listing of already-set time zones may be displayed. When selecting the listing of already-set time zones, the list of already-set time zones can be displayed in the display section 5. Also, when the display auto-reset function mode setting means 102 displays the list of time zones enabling the display auto-reset function to operate, if multiple time zones enabling the display auto-reset function to operate to be set separately by the time zone setting means 103 have part where their time zones are overlapping, then the multiple time zones are treated as one time zone including all the multiple time zones.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A radio paging receiver, comprising:
   a display; and
   means for controlling said display to be turned off automatically when no switch operation nor reception message is detected during a predetermined time period within a predetermined time zone,
   wherein said controlling means determines whether the current time falls within said predetermined time zone and turns off said display only when said current time falls within said predetermined time zone,
   wherein said predetermined time zone comprises a start time and an end time selectively set by a user and stored in said controlling means.

2. A radio paging receiver with a display auto-reset function having means for displaying information including a reception message that is turned off automatically when no switch operation nor reception message is detected during a predetermined time period, comprising:
   first setting means for setting a display auto-reset function mode to enable said display auto-reset function;
   second setting means for setting a time zone to enable said display auto-reset function to operate when a setting to turn on said display auto-reset function mode is selected by said first setting means; and
   control means for checking whether said detection for switch operation and reception message is conducted within said time zone or not, based on the setting information of said first and second setting means, when no switch operation nor reception message is detected during said predetermined time period, and outputting a control signal to control the power supply for said displaying means to be turned off automatically when said detection is conducted within said time zone
   wherein said control means turns off said displaying means only when said first setting means sets a display auto-reset function mode to on and said predetermined time period falls within said time zone set by said second setting means.

3. A radio paging receiver with a display auto-reset function that means for displaying information including a reception message is turned off automatically when no switch operation nor reception message is detected during a first predetermined time period, comprising:

a display auto-reset function mode setting means for setting the turn-on or turn-off of a display auto-reset function mode to enable said display auto-reset function;

a time zone setting means for setting a time zone to enable said display auto-reset function to operate when said display auto-reset function mode is set to turn on by said display auto-reset function mode setting means; and a display auto-reset function mode setup and operation controlling means for controlling said display auto-reset function mode setting means and said time zone setting means to start up when setting the turn-on or turn-off of said display auto-reset function mode, determining whether the current time falls within said time zone to enable said display auto-reset function to operate while the display auto-reset function mode is set to turn on, when no switch operation nor reception message is detected during said first predetermined time period after coming to the waiting time after completing the setting by said display auto-reset function mode setting means and said time zone setting means, and outputting a control signal to control the power supply for said displaying means to be turned off automatically when said detection is conducted within said time zone.

4. A radio paging receiver, according to claim 3, further comprising:

a time counting means that, when the display auto-reset function mode is set to turn on and no switch operation nor reception message is detected during said first predetermined time period within said time zone enabling said display auto-reset function to operate, counts time during a second predetermined time period and detects said second predetermined time period passed away, and a time period setting means for setting said second predetermined time period, wherein said display auto-reset function mode setup and operation controlling means outputs a control signal to turn off automatically the power supply for said displaying means when detecting that said second predetermined time period passed away, stopping the counting of said time counting means when a switch operation or reception message is detected before said second predetermined time period passes away.

5. A radio paging receiver, according to claim 4, wherein:

said time zone setting means is capable of setting multiple time zones enabling said display auto-reset function to operate.

6. A radio paging receiver, according to claim 5, wherein:

said time period setting means is capable of setting said second predetermined time specific to each of said multiple time zones enabling said display auto-reset function to operate to be set by said time zone setting means.

7. A radio paging receiver, according to claim 3, wherein:

said time zone setting means is capable of setting multiple time zones enabling said display auto-reset function to operate.

8. A radio paging receiver, according to claim 7, wherein:

said time period setting means is capable of setting said second predetermined time specific to each of said multiple time zones enabling said display auto-reset function to operate to be set by said time zone setting means.

9. A method for controlling the display auto-reset function of a radio paging receiver with a display auto-reset function having means for displaying information including a reception message that is turned off automatically when no switch operation nor reception message is detected during a first predetermined time period, said radio paging receiver comprising:

a display auto-reset function mode setting means for setting the turn-on or turn-off of a display auto-reset function mode to enable said display auto-reset function;

a time zone setting means for setting a time zone to enable said display auto-reset function to operate when said display auto-reset function mode is set to turn on by said display auto-reset function mode setting means; and a display auto-reset function mode setup and operation controlling means for controlling said display auto-reset function mode setting means and said time zone setting means to start up when setting the turn-on or turn-off of said display auto-reset function mode, determining whether the current time falls within said time zone to enable said display auto-reset function to operate while the display auto-reset function mode is set to turn on, when no switch operation nor reception message is detected during said first predetermined time period after coming to the waiting time after completing the setting by said display auto-reset function mode setting means and said time zone setting means, and outputting a control signal to control the power supply for said displaying means to be turned off automatically when said detection is conducted within said time zone, comprising:

displaying a first setup display image for setting the turn-on or turn-off of said display auto-reset function mode to be selected from a function menu list;

returning said radio paging receiver to the waiting state when said display auto-reset function mode is set to turn off in a first selection that selects either the turn-on or turn-off of said display auto-reset function mode on said first setup display image;

displaying a second setup display image for selecting the full-time turn-on of said display auto-reset function mode or the setting of said time zone to turn on said display auto-reset function mode, when said display auto-reset function mode is set to turn on in said first selection;

returning said radio paging receiver to the waiting state when the full-time turn-on of said display auto-reset function mode is selected in a second selection that selects either the full-time turn-on of said display auto-reset function mode or the setting of said time zone to turn on said display auto-reset function mode on said first setup display image;

displaying a third setup display image for setting said time zone to enable said display auto-reset function mode when the setting of said time zone to turn on said display auto-reset function mode is selected in said second selection; and storing start time and end time defining said time zone to enable said display auto-reset function to be set on the third setup display image into said time zone setting means, so that said start time and end time is used as information from said time zone setting means for detecting whether the current time falls within said time zone to enable said display auto-reset function, wherein said steps are controlled by said display auto-reset function mode setup and operation controlling means.

10. A radio paging receiver with a display auto-reset function for displaying information including a reception message that is turned off automatically when no switch operation nor reception message is detected during a first predetermined time period, comprising:

a display auto-reset function mode setting device for setting the turn-on or turn-off of a display auto-reset function mode to enable said display auto-reset function;

a time zone setting device for setting a time zone to enable said display auto-reset function to operate when said display auto-reset function mode is set to turn on by said display auto-reset function mode setting device; and a display auto-reset function mode setup and operation controller for controlling said display auto-reset function mode setting device and said time zone setting device to start up when setting the turn-on or turn-off of said display auto-reset function mode, determining whether the current time falls within said time zone to enable said display auto-reset function to operate while the display auto-reset function mode is set to turn on, when no switch operation nor reception message is detected during said first predetermined time period after coming to the waiting time after completing the setting by said display auto-reset function mode setting device and said time zone setting device, and outputting a control signal to control the power supply for said displaying device to be turned off automatically when said detection is conducted within said time zone.

11. The radio paging receiver, according to claim 10, further comprising:

a time measuring device that, when the display auto-reset function mode is set to turn on and no switch operation nor reception message is detected during said first predetermined time period within said time zone enabling said display auto-reset function to operate, measures time during a second predetermined time period and detects said second predetermined time period has elapsed, and a time period setting device for setting said second predetermined time period, wherein said display auto-reset function mode setup and operation controller outputs a control signal to turn off automatically the power supply for said displaying device when detecting that said second predetermined time period has elapsed, stopping the measuring of said time measuring device when a switch operation or reception message is detected before said second predetermined time period has elapsed.

12. The radio paging receiver, according to claim 11, wherein said time zone setting device sets multiple time zones enabling said display auto-reset function to operate.

13. The radio paging receiver, according to claim 12, wherein said time period setting device sets said second predetermined time specific to each of said multiple time zones enabling said display auto-reset function to operate to be set by said time zone setting device.

14. The radio paging receiver, according to claim 10, wherein said time zone setting device sets multiple time zones enabling said display auto-reset function to operate.

15. The radio paging receiver, according to claim 14, wherein said time period setting device sets said second predetermined time specific to each of said multiple time zones enabling said display auto-reset function to operate to be set by said time zone setting device.

* * * * *